US012762911B2

(12) United States Patent
Laforges

(10) Patent No.: US 12,762,911 B2
(45) Date of Patent: Oct. 13, 2026

(54) MULTIPLE TAMPER DETECTION TECHNIQUES FOR SECURE ACCESS DEVICE

(71) Applicant: ASSA ABLOY AB, Stockholm (SE)

(72) Inventor: Martin Anthony Laforges, Bridgend (GB)

(73) Assignee: ASSA ABLOY AB, Stockholm (SE)

( * ) Notice: Subject to any disclaimer, the term of this patent is extended or adjusted under 35 U.S.C. 154(b) by 118 days.

(21) Appl. No.: 18/257,651

(22) PCT Filed: Dec. 7, 2021

(86) PCT No.: PCT/EP2021/084590

§ 371 (c)(1), (2) Date: Jun. 15, 2023

(87) PCT Pub. No.: WO2022/128626

PCT Pub. Date: Jun. 23, 2022

(65) Prior Publication Data

US 2024/0119769 A1 Apr. 11, 2024

Related U.S. Application Data

(60) Provisional application No. 63/126,005, filed on Dec. 16, 2020.

(51) Int. Cl.
*G07C 9/00* (2020.01)

(52) U.S. Cl.
CPC ................................ *G07C 9/00182* (2013.01)

(58) Field of Classification Search
CPC ............ G07C 9/00182; G07C 9/00174; G08B 29/046
See application file for complete search history.

(56) References Cited

U.S. PATENT DOCUMENTS

| | | | | |
|---|---|---|---|---|
| 7,382,895 | B2 | 6/2008 | Bramblet et al. | |
| 9,805,534 | B2 | 10/2017 | Ho et al. | |
| 2004/0017929 | A1* | 1/2004 | Bramblet ................. | G07C 9/00 382/103 |
| 2007/0247526 | A1* | 10/2007 | Flook ................. | G08B 13/1961 348/161 |
| 2017/0124792 | A1* | 5/2017 | Schoenfelder .......... | G06F 21/34 |

(Continued)

FOREIGN PATENT DOCUMENTS

| | | |
|---|---|---|
| GB | 2540173 | 1/2017 |
| WO | 2022128626 | 6/2022 |

OTHER PUBLICATIONS

"International Application Serial No. PCT EP2021 084590, International Search Report mailed Apr. 11, 2022", 4 pgs.

(Continued)

*Primary Examiner* — Nabil H Syed
(74) *Attorney, Agent, or Firm* — Schwegman Lundberg & Woessner, P.A.

(57) ABSTRACT

Techniques for detecting tapering of a physical access control device or a barrier secured by the physical access control device are provided. In an example, an apparatus to control physical access to a secure area via an opening can include multiple tamper sensors. The controller can generate a tamper signal based on a discrepancy between signals received form the multiple tamper sensors and one or more profile signals.

10 Claims, 5 Drawing Sheets

(56) References Cited

U.S. PATENT DOCUMENTS

| | | | | |
|---|---|---|---|---|
| 2017/0301162 | A1 | 10/2017 | Radicella et al. | |
| 2020/0247359 | A1 | 8/2020 | Murray et al. | |
| 2021/0287469 | A1* | 9/2021 | Ryhorchuk | G06V 40/172 |
| 2021/0327176 | A1* | 10/2021 | Baumgarte | G08B 13/02 |

OTHER PUBLICATIONS

"International Application Serial No. PCT EP2021 084590, Written Opinion mailed Apr. 11, 2022", 13 pgs.

"European Application Serial No. 21836381.0, Response to Communication Pursuant to Rules 161 and 162 EPC Filed Feb. 2, 2024", 17 pgs.

"International Application Serial No. PCT/EP2021/084590, International Preliminary Report on Patentability mailed Jun. 29, 2023", 15 pgs.

"European Application Serial No. 21836381.0, Communication Pursuant to Article 94(3) EPC mailed 0212-26", 13 pgs.

* cited by examiner

MULTIPLE TAMPER DETECTION TECHNIQUES FOR SECURE ACCESS DEVICE

CROSS-REFERENCE TO RELATED APPLICATION(S)

This application is a national stage application under 35 U.S.C. § 371 of PCT Application No. PCT/EP2021/084590, titled "MULTIPLE TAMPER DETECTION TECHNIQUES FOR SECURE ACCESS DEVICE," filed Dec. 7, 2021, which claims priority to U.S. Provisional Patent Application No. 63/126,005, titled "MULTIPLE TAMPER DETECTION TECHNIQUES FOR SECURE ACCESS DEVICE," filed Dec. 16, 2020, each of which is hereby incorporated by reference herein in its entirety.

FIELD OF THE DISCLOSURE

The present document relates to physical access control systems (PACS) and more particularly to techniques for detecting tampering with a physical access control device using multiple detection techniques.

BACKGROUND OF THE DISCLOSURE

In general, physical access control systems (PACS) assist in deterring and preventing honest people from accessing a secure area to which the person is not desired. Other people can view a device within the PACS as a challenge and may look to defeat the device by some form of destructive violation or removal in order to gain access to the secure area or the contents within the secure area. For example, for door strike access control devices, communications or wiring often traverse from an unsecured side of the access control assembly (e.g. door, window, etc.) to the secure side of the access control assembly. Such systems have been defeated by accessing the communication or wiring through disassembly of the access control device from the unsecured side of the access control assembly.

SUMMARY OF THE DISCLOSURE

Techniques for detecting tapering of a physical access control device or a barrier secured by the physical access control device are provided. In an example, an apparatus to control physical access to a secure area via an opening can include multiple tamper sensors. The controller can generate a tamper signal based on a discrepancy between signals received form the multiple tamper sensors and one or more profile signals.

This section is intended to provide an overview of subject matter of the present patent application. It is not intended to provide an exclusive or exhaustive explanation of the invention.

DETAILED DESCRIPTION

Figure 1:
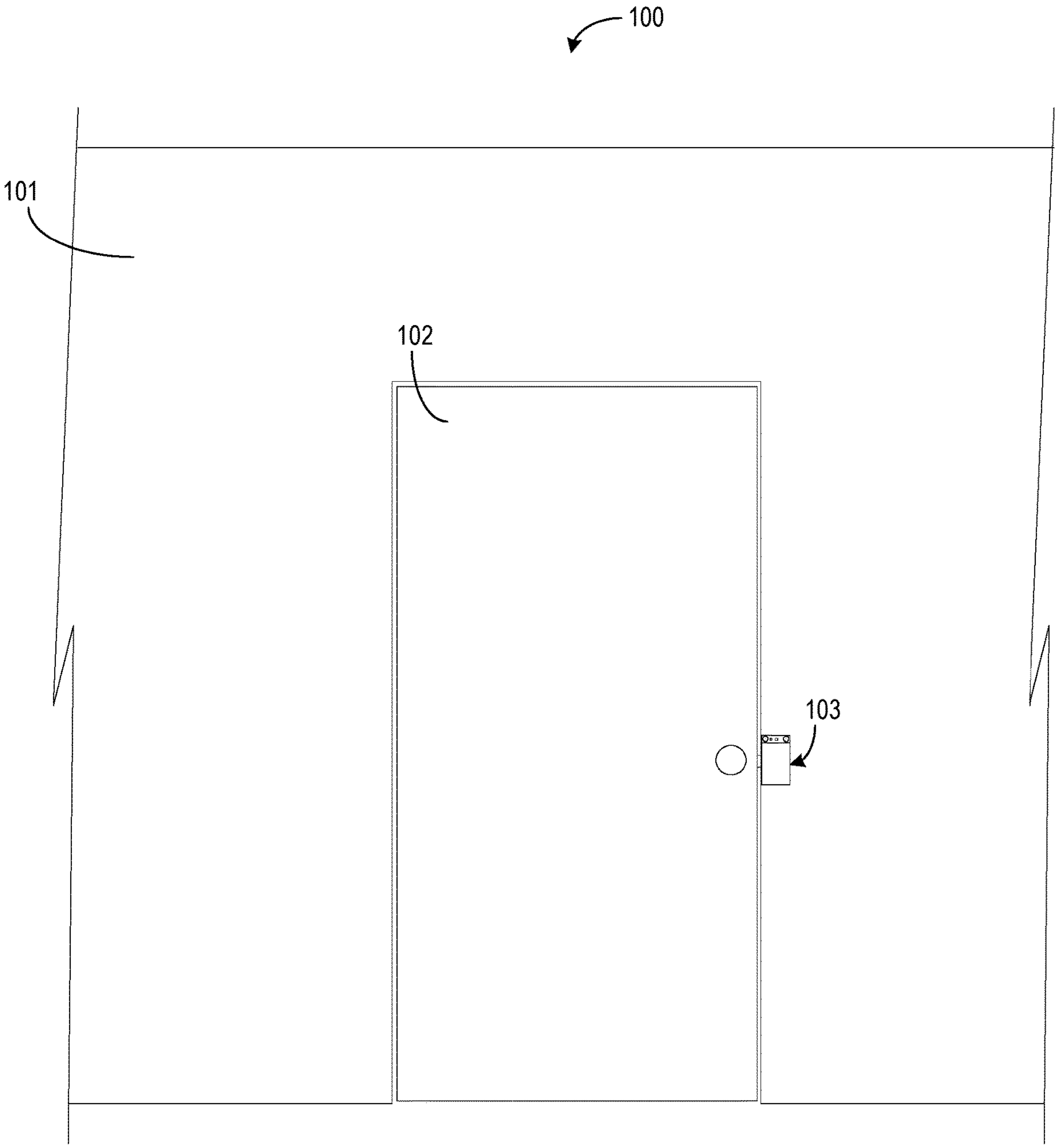
FIG. 1 illustrates generally an environment including components of an example PACS system according to the present subject matter.

Physical access control covers a range of systems and methods to govern access, for example by people, to secure areas or secure assets. Physical access control includes identification of authorized users or devices (e.g., vehicles, drones, etc.) and actuation of a gate, door, or other facility used to secure an area or actuation of a control mechanism, e.g., a physical or electronic/software control mechanism, permitting access to a secure asset. Physical access control systems (PACS) can include a reader (e.g., an online or offline reader) that holds authorization data and can be capable of determining whether credentials (e.g., from credential or key devices such as radio frequency identification (RFID) chips in cards, fobs, or personal electronic devices such as mobile phones) are authorized for an actuator or control mechanism (e.g., door lock, door opener, software control mechanism, turning off an alarm, etc.), or PACS can include a host server to which readers and actuators are connected (e.g., via a controller) in a centrally managed configuration. In centrally managed configurations, readers can obtain credentials from credential or key devices and pass those credentials to the PACS host server. The host server then determines whether the credentials authorize access to the secure area or secure asset and commands the actuator or other control mechanism accordingly.

As discussed above, brute force can be used to violate and defeat devices in a PACS system and allow access to areas or assets by persons that are not authorized to access such areas or assets. In order to defeat such brute force activities, conventional methods can include securing an area or asset with multiple PACS devices or employing a single tamper detector for a PACS device of a PACS system. The goal of employing multiple PACS devices at an access point of the area or asset is to discourage an intruder from continuing a brute force attack should the intruder succeed in defeating a first PACS device. The goal of employing a single tamper detector with a PACS device is to detect a condition of a brute force attack and raise an alarm. The alarm may or may not be annunciated to the intruder. If annunciated to the intruder, the alarm is designed to alarm the intruder and hopefully encourage the intruder to quit the brute force attack and avoid detection. If the alarm is not annunciated to the intruder, the alarm may, for example, be transmitted to an interested party to allow for catching the intruder in the act of violating the PACS device.

A conventional tamper detector is a switch. Upon installation of a PACS device, the switch can include a mechanism that detects proper installation of the PACS device. Should an intruder try to defeat the PACS device by altering the installed state of the PACS device, upon altering the state of the mechanism of the switch, such as by moving the installed PACS from the installed position of the PACS device, the state of the switch can change. A signal from to the switch can be detected by a controller of the PACS device and can raise a tamper alarm. The tamper alarm can be annunciated to the intruder, can be transmitted to an interested party, or combination thereof to deter further activity of the intruder.

However, intruders have learned about the location of conventional tamper switches and mechanisms of the tamper detector of various PACS devices. Knowing the location of the tamper detector has allowed intruders to formulate new ways to carry out brute force attacks. Such new brute force attacks can include dismantling the installed state of the PACS device without triggering the mechanism of the switch of the tamper detector.

Examples of the present disclosure are generally directed to more robust techniques for detecting tampering of a PACS device and generating alarms based on the detected tampering activity. FIG. 1 illustrates generally an environment 100 including components of an example PACS system according to the present subject matter. The environment 100 can include a barrier, such as a wall 101, an access mechanism, such as a door 102, and a PACS device 103. The barrier is a structure for securing an area or an asset and can include, but is not limited to, one or more walls 101, a container, binding structures such as chains or brackets, or combinations thereof. The access mechanism can operate in cooperation with the PACS device 103 to allow authorized access to the secure area or secure asset and can include, but is not limited to, a door 102, a window, a latch, a lock, or combinations thereof.

In the illustrated environment 100, the access mechanism includes a door 102 to separate a first area on a first side of the wall 101 from a second, secure area on the other side of the wall 101. The PACS device 103 locks or otherwise secures the door 102 from allowing access to the secure area until an authorized input is received and verified. Although the combination of the wall 101, door 102 and PACS device 103 give the perception that access to the secure area is impossible without a proper input for the PACS device 103, malicious actors can attempt to defeat the door 102 or PACS device 103 by tampering with the environment 100 such as by physically altering, disassembling, or destroying the PACS device 103 or the door 102. However, the example PACS device 103 includes sensors and logic to detect a tampering event via more than one sensor. As such, even if the malicious actor takes care to avoid triggering a first tamper detection tool of the example PACS device 103, the tampering can be detected by one or more other tamper detection tools of the example PACS device 103. In certain examples, the PACS device 103 is a standalone device. In some examples, the PACS device 103 is part of a PACS system and can include communicating circuitry to exchange information with another component of the PACS system. In certain examples, the PACS device 103 can communicate using one or more communication protocols or mediums. Such communication mediums may be wired, wireless, optical, or combinations thereof.

Figure 2:
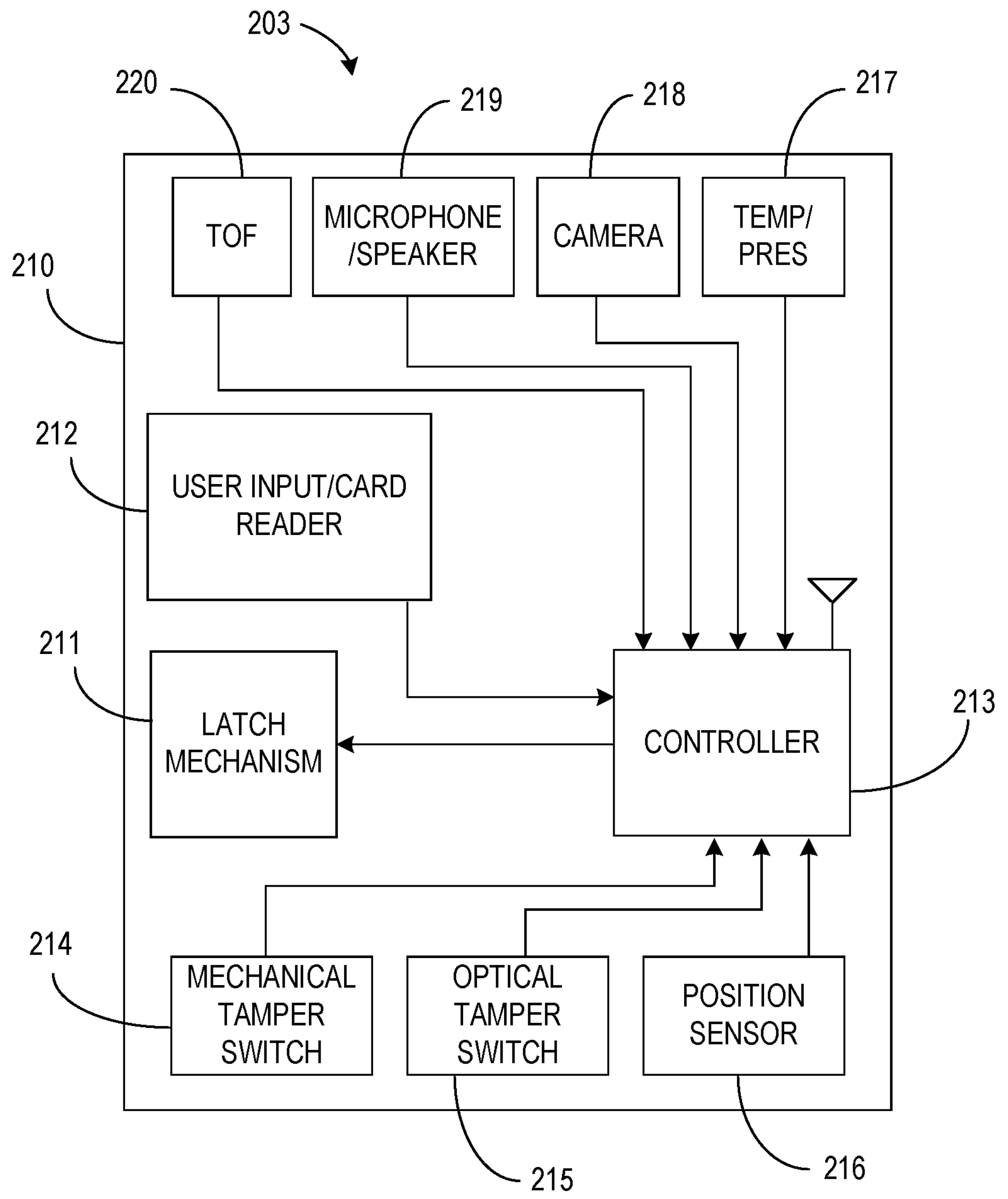
FIG. 2 illustrates generally a block diagram of an example PACS device according to the present subject matter.

FIG. 2 illustrates generally a block diagram of an example PACS device 203 according to the present subject matter. The PACS device 203 can include a housing 210, a latch mechanism 211, a user input device 212, a controller 213 and multiple sensors 214, 215, 216, 217, 218, 219, 220. The latch mechanism 211 can secure and release an access mechanism, such as a door, window, etc., in response to information received form the controller 213. In some examples, the latch mechanism 211 may be connected with an external latch element, separate from the PACS device 203, which the latch mechanism may control in order to secure and release the access mechanism. The user input device 212 can allow security information to be received by the controller 213 from a user attempting to gain access to the secure area or asset. Such input devices 212 can include, but are not limited to, a key receiver, a keypad, a credential reader (such as a card reader), a biometric sensor, or combinations thereof.

The multiple sensors can include, but are not limited to, a time of flight sensor 220, an audio transducer 219, a camera 218, a temperature and or pressure sensor 217, a mechanical tamper switch 214, an optical tamper switch 215, and a position or motion sensor 216. It is understood that depending on the application of the PACS device 203 one or more of the sensors can be optional. In certain examples, one or more of the multiple sensors can be employed to assist in verifying authorization for a user attempting to gain access to a secure area or asset. For example, the camera 218 can be used as a biometric sensor such as for capturing an image of a user's face, other body part, or other security instrument and using the image for recognition and authorization purposes. For example, facial recognition processing may be conducted using an image of a user's face captured using the camera 218 and authorization of access can be dependent on matching facial markers with facial markers of a reference image. Likewise, the audio transducer 219 may be used for voice recognition for a user to be verified as a user authorized to access the secured area or asset.

In certain examples, each of the illustrated sensors may also be used to detect malicious tampering of the PACS device 203 or the access mechanism such as a door, window, etc. The mechanical tamper switch 214 is a switch that is normally in a first state when the PACS device 203 is installed, and normally in a second state when the PACS device 203 is not installed or at least not properly installed. As the PACS device is installed, a component of the barrier or the access mechanism can maintain the mechanical tamper switch 214 in the first state. Should maliciously tampering of the PACS device 203 jar the PCAS device 203 from an installed state, the mechanical tamper switch 214 can revert to the second state and trigger the controller 213 to issue a tamper alarm.

The optical tamper switch 215 can detect a light and can use the light detection to detect whether the PACS device 203 is properly installed or may have been at least partially uninstalled or tampered with. In certain examples, the optical tamper switch 215 detects light reflected from a component of the barrier or access mechanism when installed properly and maintains a first state of an output to the controller 213. Should malicious tampering of the PACS device 203 jar the PCAS device 203 from an installed state, the optical tamper switch 215 can fail to detect the reflected light and revert to the output to a second state that can trigger the controller 213 to issue a tamper alarm.

A position sensor 216 can include an accelerometer or a gyroscope to provide acceleration information, position information, orientation information or combinations thereof. Such devices can provide real time, or substantially real time information about the orientation and movement of the installed PACS device 203. In some situations, a position sensor 216 can provide an early warning of malicious tampering by detecting, for example, vibrations and movements of the PACS device 213 indicative of a malicious actor trying to mechanically alter, disassemble, or destroy the PACS device 203 or the access mechanism. Information received from the position sensor 216 can be analyzed by the controller 213 to determine whether the movements or vibration detected are normal or indicative of malicious activity. If the information matches profiles for malicious activity or do not match any profiles for normal activity, the controller 213 can issue a tamper alarm.

In some examples, the signals of the position sensor 216 may not be able to determine early tampering detection. However, should the malicious activity result in a large displacement or change in orientation of the PACS device 203 including the position sensor, an indication the PACS device 203 is being disassembled, uninstalled, or destroyed, the controller 213 can detect such large displacement and issue a tamper alarm.

In certain examples, the PACS device 203 can include one or more temperature or pressure sensors 217. In addition to providing ambient temperature and pressure information, the sensor(s) 217 may also be used to detect tampering of the PACS device 203. For example, detecting a large temperature or pressure change using a single temperature or pressure sensor 217 can be an indication of the housing 210 of the PACS device being breached and upon such detection the controller 213 can issue a tamper alarm. In certain examples, more than one temperature or pressure sensor 217 can allow temperature and pressure to be monitored within the housing 210 of the PACS device 203, on the secure side of the barrier, on the unsecured side of the barrier, or combinations thereof. In certain examples, when the difference between measurements of the various sensors 217 meet a threshold, sudden movement of these measurements toward equalization, without recording an authorized access, can indicate that the PACs device 203 or the access mechanism has been tampered with and the controller 213 can issue a tamper alarm. A pressure switch can be particularly effective for detecting tamper activity directed toward a hermetically sealed portion of a PACS device.

In certain examples, the PACS device 203 can include one or more cameras 218. The cameras 218 can be used for to gather images for verifying an authorized user or security instrument for the purposes of allowing access to a secure area or asset. For example, the controller 213 can use a camera 218 to capture an image of a user requesting access controlled by the PACS device 203. The captured image information can be used, for example, for facial recognition of the user. In such a scenario, identification information associated with a key card or key code employed by the user can be further scrutinized by evaluating the captured image with a reference image associated with the identification information. If the captured image passes facial recognition tests with the reference image, the user can be granted access to the secure area or asset. If the captured image fails to be reconciled with the reference image associated with the identification information referenced by the key card or key code, the request for access can be ignored and the controller can generate an alarm indicating an access request discrepancy.

Additionally or alternatively to the access functions, the camera 218 may also provide an early detection of tampering with the PACS device 203 or access mechanism. For example, upon or after installation of a PACS device 203 including a camera 218, an image of the vista viewable with the camera 218 can be captured and stored as a reference vista image. Whether triggered by user activity or other sensors, or merely executed on a regular interval, captured images of the camera 218 can be evaluated by the controller 213 for indications of tampering. For example, upon capturing an image from the camera 218 during normal operation of the PACS device 203, location(s) and/or orientation (s) of visible background features of the image can be compared to the location(s) and/or orientation(s) of the corresponding background features of the reference vista image. If the location or orientation of a background feature of the captured image departs in a significant way from the location or orientation of the corresponding background feature of the reference vista image, the controller 213 can generate a tamper alarm. In certain examples, the camera 218 can provide digital images to the controller 213. In some examples, the digital image camera is a stereo camera. In some examples, the camera 218 can be a time-of-flight (TOF) sensor 220 or camera. In certain examples, the PACS device 203 can include a digital image camera 218 and a TOF sensor 220.

TOF sensor or camera information can provide precise distance measurement information about an object of focus. Such distance information from a captured image can be evaluated with respect to reference distance information of certain background objects. If the captured distance information of one or more background objects departs from reference distance information for corresponding background objects by a threshold, the controller 213 can generate a tampering alarm because such a difference can be an indication that the PACS device 203 has been dislodged or moved relative to the position in which it was originally installed.

An audio transducer 219 such as a microphone, a speaker, or a combination of a microphone and speaker can be used to receive information from the user and to direct the actions of the user while the user is attempting to gain access to the secure area or the secure asset. Additionally or alternatively, a microphone of the audio transducer 219 can assist in detecting tampering activity. In certain examples, audio information received at the controller from the audio transducer can be compared with audio profile information indicative of normal activity or to audio profiles indicative of malicious activity. If audio information received from the audio transducer 219 matches audio information associated with a malicious activity audio profile within a threshold, or audio information received from the audio transducer does not match any of the audio information associated with normal activity within a threshold, the controller can issue a tamper alarm.

Figure 3A:
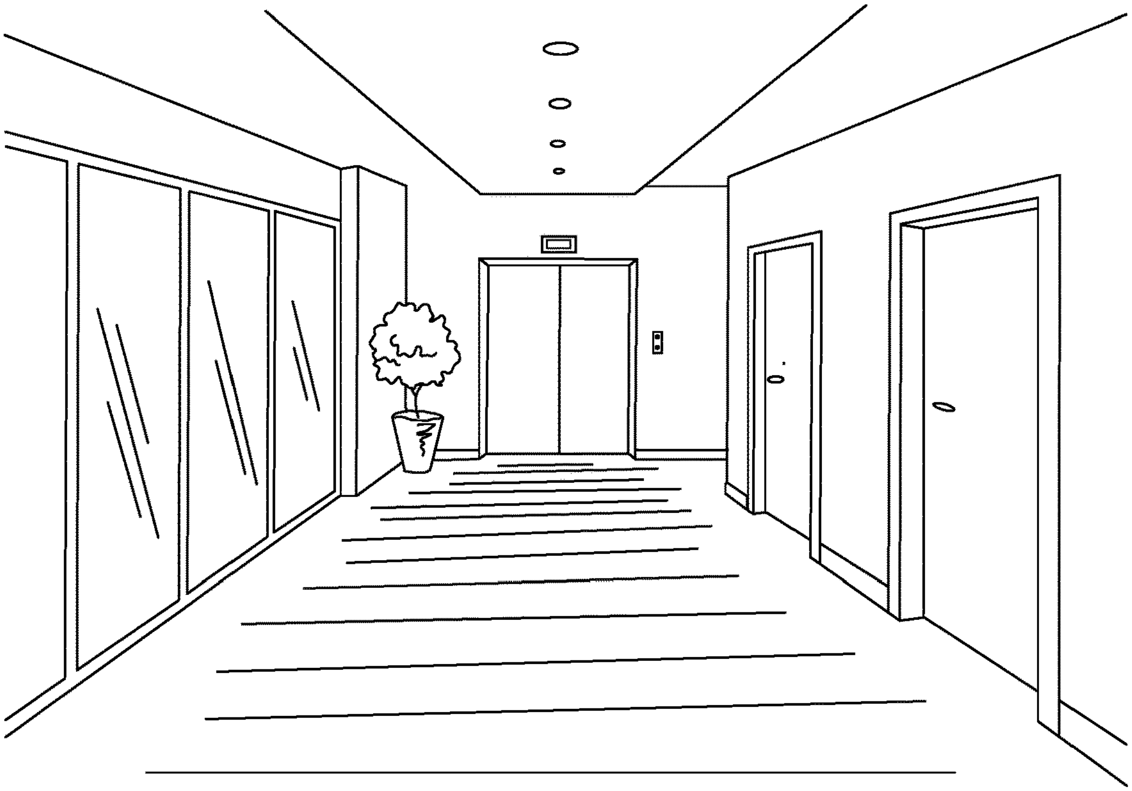
FIG. 3A illustrates generally an example of a reference vista view a camera of a PACS device may retain after the PACS device is installed.
Figure 3B:
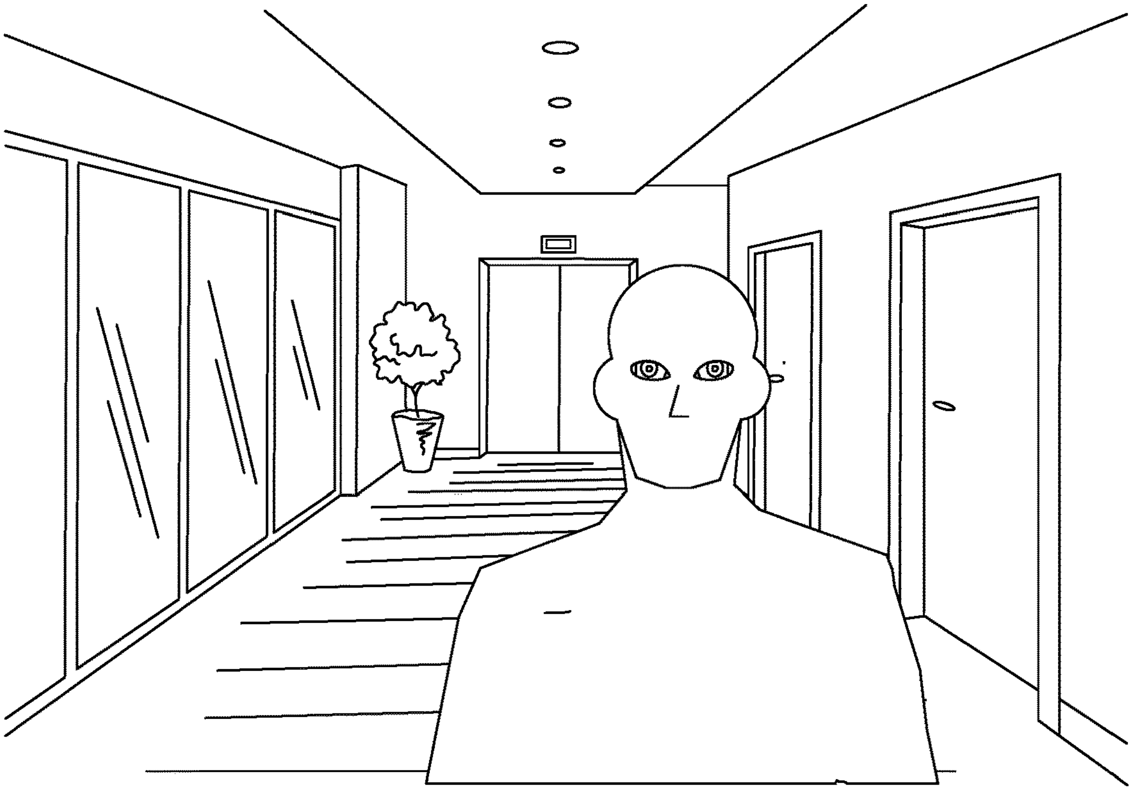
FIG. 3B illustrates an example image captured when triggered by, for example, an input device of the PACS device.
Figure 4A:
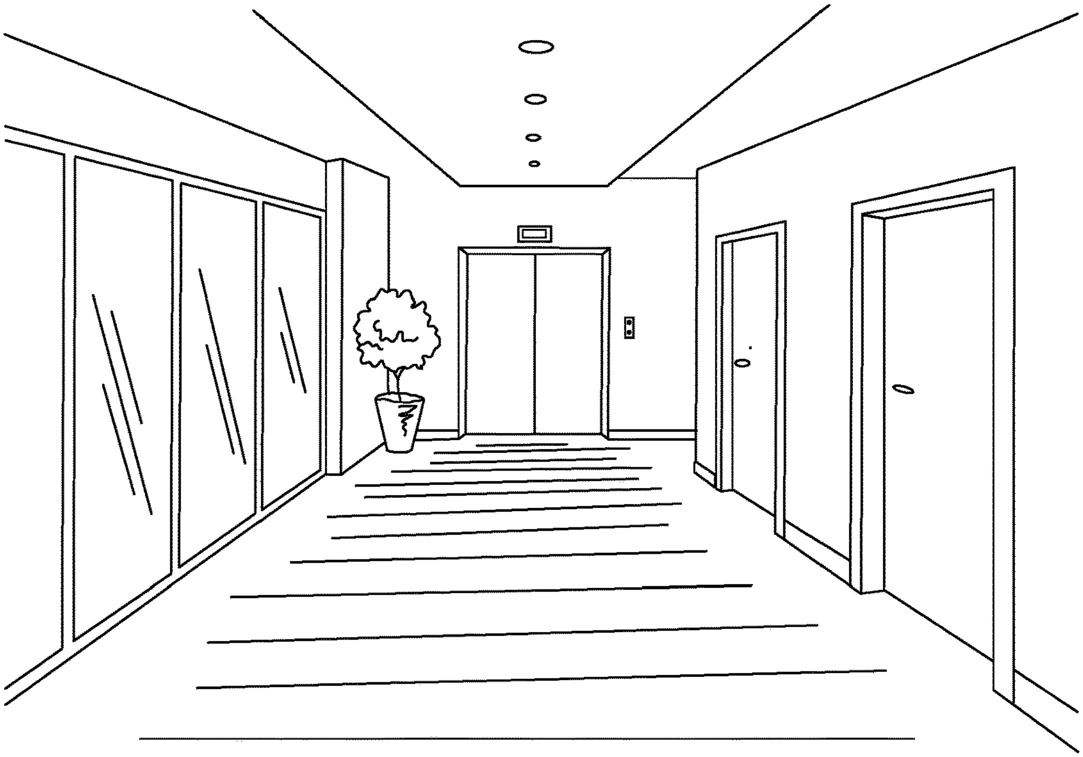
FIG. 4A illustrates generally an example of a reference vista view a camera of a PACS device may retain after the PACS device is installed.

FIGS. 3A and 4A illustrate generally an example of a reference vista view a camera of a PACS device may retain after the PACS device is installed. FIG. 3B illustrates an example image captured when triggered by, for example, an input device of the PACS device. The controller of the PACS device can receive the image information of FIG. 3B and can compare background features of the image with background features of the reference image of FIG. 3A to determine whether the PACS device has been tampered. From a visual comparison, the background features of the captured image of FIG. 3B appear in the same place and orientation as the corresponding background features of the reference image of FIG. 3A. Therefore, the controller would not raise a tamper alarm based on the captured image of FIG. 3B.

Figure 4B:
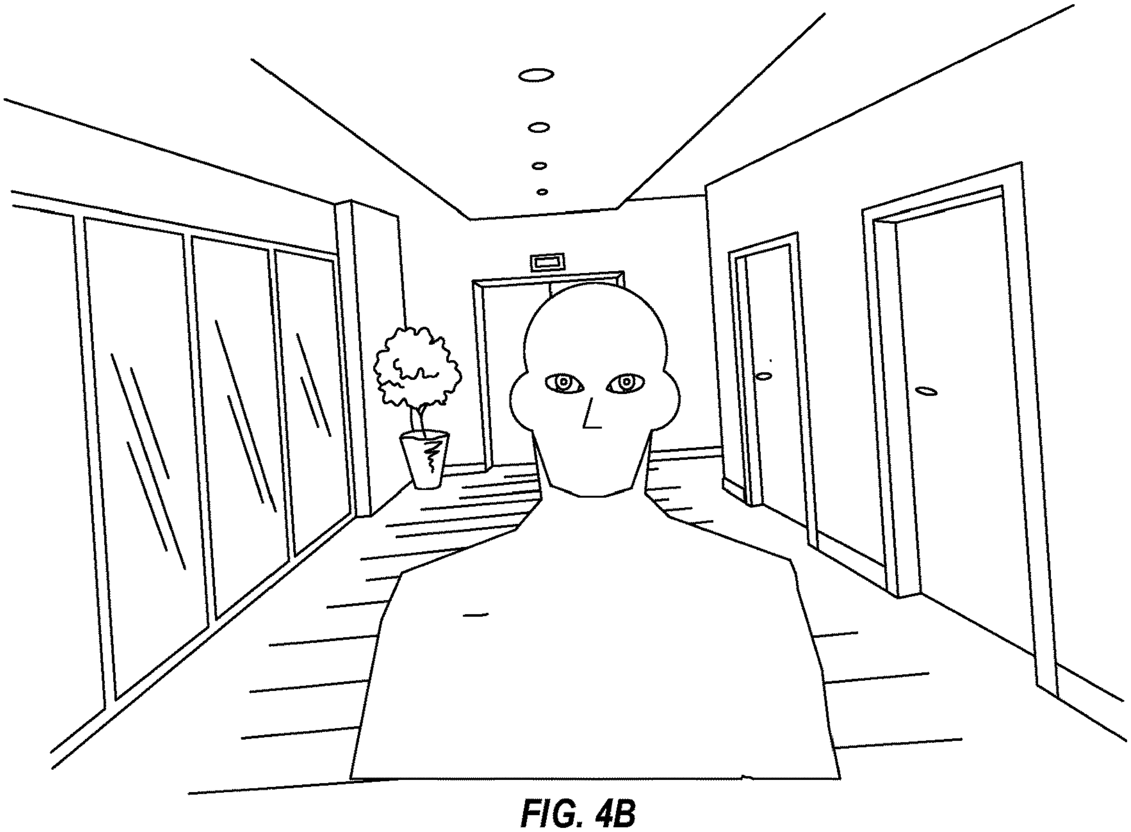
FIG. 4B illustrates generally a second example image captured by a camera and triggered, for example, by audio information that did not match normal activity of the PACS device.

FIG. 4B illustrates generally a second example image captured by a camera and triggered, for example, by audio information that did not match normal activity of the PACS device. The controller of the PACS device can receive the image information of FIG. 4B and can compare background features of the image with background features of the reference image of FIG. 4A to determine whether the PACS device has been tampered. From a visual comparison, the background features of the captured image of FIG. 4B appear to be offset or rotated from the corresponding background features of the reference image of FIG. 4A. Therefore, the controller can raise a tamper alarm based on the captured image of FIG. 4B, as it appears that the PACS device may have been dislodged from its original installed position corresponding to image 4A.

Figure 5:
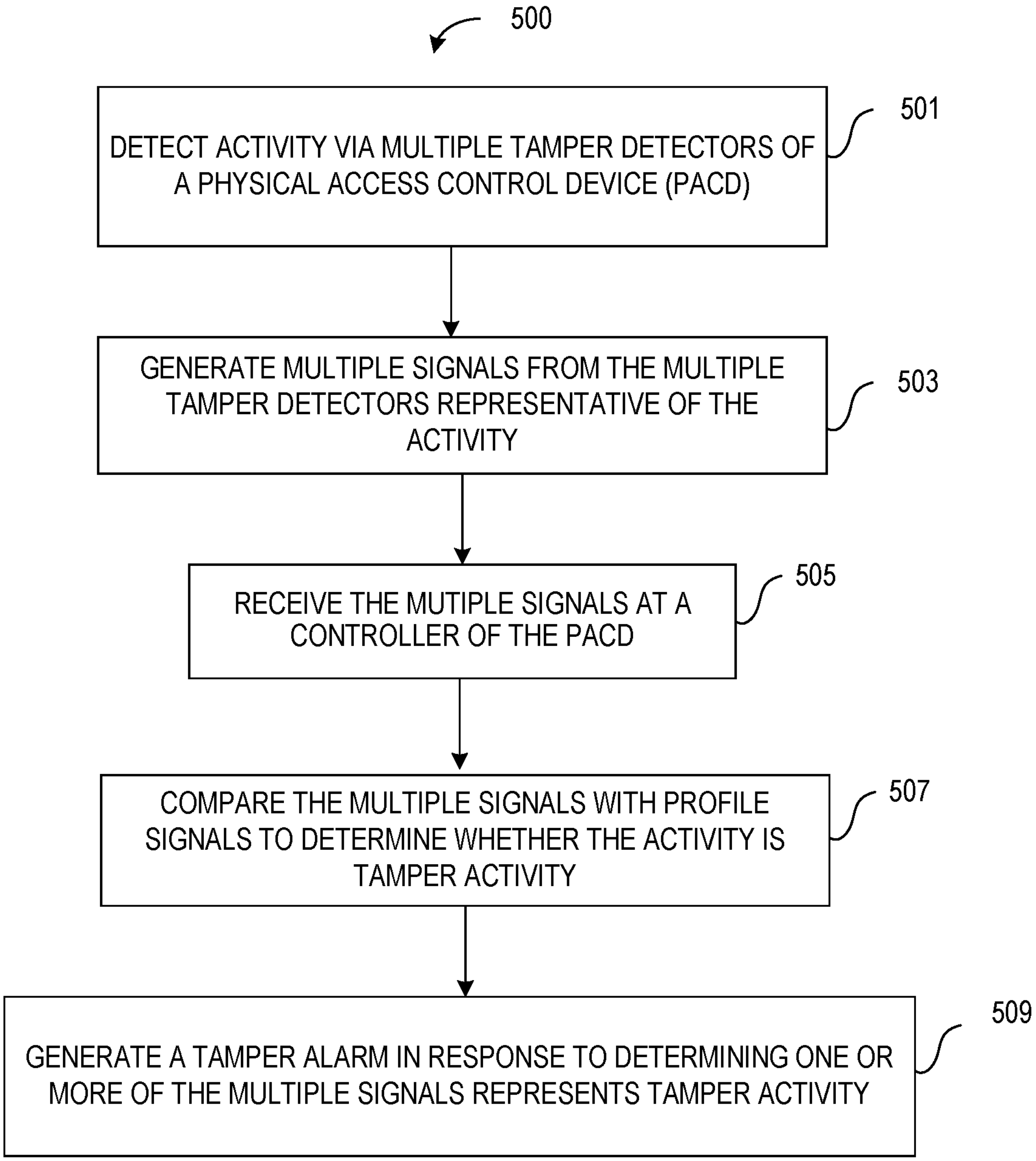
FIG. 5 illustrates generally a flowchart of an example method of providing a tamper alarm using a PACS device.

FIG. 5 illustrates generally a flowchart of an example method of providing a tamper alarm using a PACS device. At 501, activity directed at a PACS device can be detected by multiple tamper detectors of the physical access control device. Such detectors can include, but are not limited to, optical sensors such as cameras or TOF sensors, an audio transducer, a temperature sensor, a pressure sensor, a position sensor, an optical tamper switch, a mechanical tamper switch, or combinations thereof. At 503, the multiple tamper detectors can generate multiple signals representative of the activity. At 505, the multiple signals can be received at the controller of the PACS device. At 507, the controller can compare the multiple signals with profile signals to determine whether one or more of the signals indicate tamper activity. In certain examples, the profile signals can represent known tamper activity such that of one or more of the signals match a profile signal within a threshold, the activity can be determined to be tamper activity. In some examples, the profile signals, or additional profile signals, can represent normal activity such that if none of the signals, or a certain number of the signals do not match a corresponding profile signal within a certain threshold, the signals can be determined to represent tamper activity. At 509, in response to determining one or more of the signals represents tamper activity, a tamper alarm can be generated. In certain examples, the tamper alarm can be transmitted to alert personnel to investigate the tamper activity.

EXAMPLES AND NOTES

In a first example, Example 1, an apparatus to control physical access to a secure area via an opening, where the secure area is on a first side of the opening, can include a user input device configured to receive a user input on a second side of the opening, and to provide a first signal; multiple tamper detectors configured to detect activity directed against the apparatus, and to generate second signals in response to the tamper activity; a controller configured to: receive the first signal; to validate the first signal; to cause a latch to be released in response to the first signal representing a valid user input, wherein release of the latch allows access to the secure area via the opening; to receive the second signals; to determine whether the second signals represent tamper activity; and to generate a tamper alarm in response to a determination that the second signals represent tamper activity.

In Example 2, the subject matter of Example 1 includes, wherein a first tamper detector of the multiple tamper detectors includes an optical sensor.

In Example 3, the subject matter of Example 2 includes, wherein a second tamper detector of the multiple tamper detectors includes an accelerometer.

In Example 4, the subject matter of Example 3 includes, wherein a third tamper detector of the multiple tamper detectors includes a pressure sensor.

In Example 5, the subject matter of Examples 1-4 includes, wherein a first tamper detector of the multiple tamper detectors includes an accelerometer.

In Example 6, the subject matter of Example 5 includes, wherein a second tamper detector of the multiple tamper detectors includes a microphone.

In Example 7, the subject matter of Examples 1-6 includes, wherein a first tamper detector of the multiple tamper detectors includes a pressure sensor.

In Example 8, the subject matter of Example 7 includes, wherein a second tamper detector of the multiple tamper detectors includes an accelerometer.

In Example 9, the subject matter of Examples 7-8 includes, wherein a second tamper detector of the multiple tamper detectors includes an optical sensor.

In Example 10, the subject matter of Examples 7-9 includes, wherein a second tamper detector of the multiple tamper detectors includes a microphone.

Example 11 is a method comprising: detecting activity at a physical access control device via multiple tamper detectors of the physical access control device; generating multiple signals from one or more of the multiple tamper detectors, the multiple signals representative of the activity; receiving the multiple signals at a controller of the physical access control device; comparing the multiple signals with one or more profile signals to determine whether the activity is tamper activity; and generating a tamper alarm in response to determining the activity represents tamper activity.

In Example 12, the subject matter of Example 11 includes, wherein detecting activity at a physical access control device includes detecting activity at a physical access control device via an accelerometer.

In Example 13, the subject matter of Examples 11-12 includes, wherein detecting activity at a physical access control device includes detecting activity at a physical access control device via a camera.

In Example 14, the subject matter of Examples 11-13 includes, wherein detecting activity at a physical access control device includes detecting activity at a physical access control device via a microphone.

In Example 15, the subject matter of Examples 11-14 includes, generating a first user input signal at a user input device of a physical access control device in response to an activity of a user; and receiving the first user input signal at the controller.

In Example 16, the subject matter of Example 15 includes, releasing a latch of the physical access control device, or causing a latch to be released, in response to a determination that the first user input signal is valid.

In Example 17, the subject matter of Examples 15-16 includes, not responding to reception of the first user input signal, or causing a latch to remain secured, in response to a determination that the first user input signal is not valid.

Example 18 is a system comprising a barrier configured to restrict access to an opening in a first state and to allow access to an opening in a second state; a physical access control device configured to selectively latch the barrier in the first state to restrict access to the opening, the physical access control device comprising: a latch mechanism configured to cause the barrier to be selectively latched; a user input device configured to receive a user input on a first side of the opening, and to provide a first signal; multiple tamper detectors configured to detect activity directed against the apparatus, and to generate second signals in response to the tamper activity; and a controller configured to: receive the first signal; to validate the first signal; to control the latch mechanism to cause the barrier to be unlatch in response to the first signal representing a valid user input; to receive the second signals; to determine whether the second signals represent tamper activity; and to generate a tamper alarm in response to a determination that the second signals represent tamper activity.

In Example 19, the subject matter of Example 18 includes, wherein the barrier is a door.

In Example 20, the subject matter of Examples 18-19 includes, wherein the barrier is a window.

In Example 21, the subject matter of Examples 18-20 includes, wherein the barrier is configured to secure an asset to a location.

Example 22 is an apparatus to control physical access to a secure area via an opening, the apparatus comprising: a latch mechanism configured to cause the opening to be selectively secured; a user input device configured to receive a user input on a second side of the opening and to provide a user input signal; an optical sensor configured to sense a vista on the second side of the opening to provide a sensed vista and generate a first optical signal based on the sensed vista; and a controller configured to: receive the user input signal; to receive the first optical signal; to generate a first tamper signal when a discrepancy between the first optical signal and a reference vista signal is determined; to validate the user input signal; and to cause the latch mechanism to allow access via the opening when the first tamper signal is not generated and the user input signal is valid.

In Example 23, the subject matter of Example 22 includes, wherein the controller is configured to wirelessly broadcast an alarm signal representative of the first tamper signal.

In Example 24, the subject matter of Examples 22-23 includes, an accelerometer configured to generate an acceleration signal responsive to movement of at least a portion of the apparatus.

In Example 25, the subject matter of Example 24 includes, wherein the controller is configured to receive the acceleration signal, and to generate a second tamper signal based on a discrepancy between the acceleration signal and one or more reference acceleration profiles.

In Example 26, the subject matter of Example 25 includes, wherein the controller is configured to wirelessly broadcast an alarm signal representative of the second tamper signal.

In Example 27, the subject matter of Examples 24-26 includes, a tamper switch configured to maintain a first state in response to proper installation of the apparatus and to maintain a second state in response to an uninstalled state of the apparatus.

In Example 28, the subject matter of Example 27 includes, wherein the controller is configured to receive a representation of the first and second states of the tamper switch, and to generate a further tamper signal in response to the second state of the tamper switch.

In Example 29, the subject matter of Examples 24-28 includes, a single housing for the user input device the accelerometer, the controller and a portion of the latch assembly.

In Example 30, the subject matter of Examples 22-29 includes, a second optical sensor configured to detect light reflected from a mounting plate separate from the apparatus and to generate a second optical signal representative of the light reflected from the mounting plate.

In Example 31, the subject matter of Example 30 includes, wherein the controller is configured to receive the second optical signal, and to generate a second tamper signal based on a discrepancy between a level of second optical signal and a reference optical signal.

In Example 32, the subject matter of Examples 22-31 includes, wherein the optical sensor is a camera; and wherein the controller is configured to capture an image of a person using the camera, to conduct a facial recognition process using the image; to allow access if the facial recognition process determines the person is authorized to access the opening; and to compare background features of the image with a reference.

Example 33 is a method comprising: generating a first user input signal at a user input device of a physical access control device in response to an activity of a user, the physical access control device at an opening to which the physical access control device controls access; receiving the first user input signal at a controller of the physical access control device; generating a first optical signal from an optical sensor of the physical access control device at an opening to which the physical access control device controls access, the first optical signal including a representation of a first vista image on an unsecured side of the opening; receiving the first optical signal at a controller of the physical access control device; and generating a tamper signal in response to determining a background component of the representation fails to match a background component of a reference image of the unsecured side of the opening.

In Example 34, the subject matter of Example 33 includes, generating a second user input signal at the user input device of the physical access control in response to a second activity of a second user; receiving the second user input signal at the controller of the physical access control device; generating a second optical signal from the optical sensor of the physical access control device at an opening to which the physical access control device controls access, the second optical signal including a second representation of a second vista image on an unsecured side of the opening; receiving the second optical signal at a controller of the physical access control device; and determining one or more background components of the second representation match corresponding background components of the reference image of the unsecured side of the opening; and comparing information of the second user input signal with stored information of the physical access control device to determine whether the second user input signal is valid for granting access to the opening.

In Example 35, the subject matter of Examples 33-34 includes, releasing a latch of the physical access control device securing the opening in response a determination the first user input signal is valid for granting access to the opening.

In Example 36, the subject matter of Examples 33-35 includes, not responding to reception of the first user input signal in response to a determination the first user input signal is not valid for granting access to the opening.

In Example 37, the subject matter of Examples 33-36 includes, receiving activity information from an audio transducer of the physical access control device at the controller; determining the activity information corresponds to pounding activity directed at the physical access control device or the opening; and generating a further tamper signal in response to determining the activity information corresponds to pounding activity directed at the physical access control device or the opening.

In Example 38, the subject matter of Examples 33-37 includes, receiving position information from a position transducer of the physical access control device at the controller; determining the position information corresponds to disassembly activity directed at the physical access control device or the opening; and generating a further tamper signal in response to determining the position information corresponds to disassembly activity directed at the physical access control device or the opening.

In Example 39, the subject matter of Example 38 includes, wherein the position transducer is an accelerometer.

Example 40 is a system comprising a barrier configured to restrict access to an opening in a first state and to allow access to an opening in a second state; a physical access control device configured to selectively latch the barrier in the first state to restrict access to the opening, the physical access control device comprising: a latch assembly configured to latch the barrier; a user input device configured to receive a user input on a second side of the opening and to provide a user input signal; a camera configured to sense a vista on the second side of the opening to provide a sensed vista and generate a first optical signal based on the sensed vista; and a controller configured to: receive the user input signal; to receive the first optical signal; to generate a first tamper signal based on a discrepancy between the first optical signal and a reference vista signal; to validate the user input signal; and to release a latch of the latch assembly when the user input signal is valid.

In Example 41, the subject matter of Example 40 includes, wherein the barrier is a door.

In Example 42, the subject matter of Examples 40-41 includes, wherein the barrier is a window.

In Example 43, the subject matter of Examples 40-42 includes, wherein the barrier is configured to secure an asset to a location.

In Example 44, the subject matter of Examples 40-43 includes, wherein the physical access control device includes an accelerometer configured to provide position information to the controller; and wherein the controller is configured to process the position information and to generate a second tamper signal in response to a determination the position information is indicative of disassembly activity of the physical access control device.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

What is claimed is:

1. An apparatus to control physical access to a secure area via an opening, the secure area being on a first side of the opening, the apparatus comprising:

a user input device configured to receive a user input on a second side of the opening, and to provide a first signal;

multiple tamper detectors configured to detect an activity directed against the apparatus, and to generate second signals in response to the activity; and a controller configured to:

store profile signals, the profile signals including respective profile signals for at least two different sensors of the multiple tamper detectors, each respective profile signal representing one or more known tamper states of one or more of the at least two different sensors;

receive the first signal;

validate the first signal;

cause a latch to be released in response to the first signal representing a valid user input, wherein release of the latch allows access to the secure area via the opening;

receive the second signals;

determine whether a comparison between the second signals from at least two different sensors of the multiple tamper detectors and the profile signals associated with the at least two different sensors indicates a tamper activity, wherein the tamper activity is detected when a second signal from a respective sensor matches the respective profile signal for that sensor within a tamper state threshold; and generate a tamper alarm in response to a determination that the second signals represent the tamper activity.

2. The apparatus of claim 1, wherein one of the multiple tamper detectors comprises an optical sensor.

3. The apparatus of claim 1, wherein one of the multiple tamper detectors comprises an accelerometer.

4. The apparatus of claim 1, wherein one of the multiple tamper detectors comprises a pressure sensor.

5. The apparatus of claim 1, wherein one of the multiple tamper detectors comprises a microphone.

6. A method comprising:

detecting activity at a physical access control device via multiple tamper detectors of the physical access control device;

generating multiple signals from two or more of the multiple tamper detectors, the multiple signals representative of the activity;

receiving the multiple signals at a controller of the physical access control device;

comparing the multiple signals with stored profile signals, the stored profile signals including respective profile signals for at least two of the multiple tamper detectors, each of the respective profile signals representing one or more known tamper states of one or more of the at least two of the multiple tamper detectors, wherein the tamper activity is determined when a signal from a respective tamper detector matches the respective profile signal for that tamper detector within a tamper state threshold, to determine whether the activity represents tamper activity; and generating a tamper alarm in response to determining the activity represents tamper activity.

7. The method of claim 6, wherein detecting activity at the physical access control device includes detecting activity via an accelerometer.

8. The method of claim 6, wherein detecting activity at the physical access control device includes detecting activity via a camera.

9. The method of claim 6, wherein detecting activity at the physical access control device includes detecting activity via a microphone.

10. The method of claim 6, comprising:

generating a first user input signal at a user input device of the physical access control device in response to an activity of a user;

receiving the first user input signal at the controller; and causing a latch to be released in response to a determination that the first user input signal is valid.

* * * * *